US012639130B2

(12) United States Patent (10) Patent No.: US 12,639,130 B2
Cowan (45) Date of Patent: May 26, 2026

(54) TOKENIZATION OF DISTRIBUTED COMPUTE RESOURCES

(71) Applicant: EDJX, Inc., Raleigh, NC (US)

(72) Inventor: John Cowan, Raleigh, NC (US)

(73) Assignee: EDJX, Inc., Raleigh, NC (US)

( * ) Notice: Subject to any disclaimer, the term of this patent is extended or adjusted under 35 U.S.C. 154(b) by 531 days.

(21) Appl. No.: 17/496,447

(22) Filed: Oct. 7, 2021

(65) Prior Publication Data

US 2022/0147400 A1 May 12, 2022

Related U.S. Application Data

(60) Provisional application No. 63/110,662, filed on Nov. 6, 2020.

(51) Int. Cl.
 *G06F 9/50* (2006.01)
 *G06F 11/30* (2006.01)
 *G06F 11/34* (2006.01)
 *H04L 67/1027* (2022.01)

(52) U.S. Cl.
 CPC .......... *G06F 9/5072* (2013.01); *G06F 9/5077* (2013.01); *G06F 11/3006* (2013.01); *G06F 11/3409* (2013.01); *H04L 67/1027* (2013.01); *G06F 2209/505* (2013.01); *G06F 2209/508* (2013.01)

(58) Field of Classification Search
 CPC .. G06F 9/5072; G06F 9/5077; G06F 11/3006; G06F 11/3409; G06F 2209/505; G06F 2209/508; H04L 67/1027; G06Q 20/145;

G06Q 20/223; G06Q 2220/00; G06Q 10/063; G06Q 30/0202; G06Q 30/0283; G06Q 30/04; G06Q 50/60
 USPC .......................................................... 718/104
 See application file for complete search history.

(56) References Cited

U.S. PATENT DOCUMENTS

| | | | | |
|---|---|---|---|---|
| 9,094,464 B1 * | 7/2015 | Scharber | ............... | H04L 67/568 |
| 9,208,167 B1 * | 12/2015 | Henderson | ........... | G06F 16/178 |
| 9,900,444 B1 | 2/2018 | Seetharaman et al. | | |
| 10,303,576 B1 * | 5/2019 | Seymour | ............... | G06F 11/301 |
| 10,631,144 B2 | 4/2020 | Duan | | |
| 10,984,474 B1 * | 4/2021 | Seymour | ............... | G06Q 20/389 |
| 11,126,530 B1 * | 9/2021 | Seymour | ............... | H04L 41/5029 |
| 11,422,844 B1 * | 8/2022 | Filiz | .................... | G06F 9/45558 |
| 2002/0161601 A1 * | 10/2002 | Nauer | ................... | H04M 15/07 |
| | | | | 705/34 |
| 2007/0019955 A1 * | 1/2007 | Mitra | .................... | H04L 47/781 |
| | | | | 398/66 |
| 2007/0057807 A1 * | 3/2007 | Walters | .................. | H05B 47/22 |
| | | | | 340/7.29 |
| 2009/0028069 A1 * | 1/2009 | Lin | ......................... | H04L 45/02 |
| | | | | 370/256 |
| 2010/0064166 A1 * | 3/2010 | Dubnicki | ............... | G06F 16/10 |
| | | | | 714/1 |
| 2011/0055156 A1 * | 3/2011 | Roberts | ............... | G06F 11/2094 |
| | | | | 711/E12.001 |

(Continued)

*Primary Examiner* — Adam Lee
(74) *Attorney, Agent, or Firm* — Neo IP

(57) ABSTRACT

The present invention provides systems and methods for tokenization of distributed compute resources. The distributed compute resources are provided in a multi-tenant hybrid fog computing cloud. The plurality of nodes are organized in a peer-to-peer edge network. The tokenization of distributed compute resources is automated and occurs in real time.

20 Claims, 4 Drawing Sheets

(56) References Cited

U.S. PATENT DOCUMENTS

| | | | |
|---|---|---|---|
| 2012/0010934 A1* | 1/2012 | Walker | G06Q 30/0267 |
| | | | 705/14.17 |
| 2015/0106245 A1* | 4/2015 | Mirajkar | G06Q 40/12 |
| | | | 705/30 |
| 2015/0106523 A1* | 4/2015 | Cui | H04L 67/1008 |
| | | | 709/226 |
| 2016/0203569 A1* | 7/2016 | Forbes, Jr. | G06Q 20/145 |
| | | | 705/34 |
| 2017/0277909 A1* | 9/2017 | Kraemer | H04L 65/80 |
| 2018/0203629 A1* | 7/2018 | Poornachandran | G06F 21/76 |
| 2019/0108747 A1* | 4/2019 | Stenning | G08B 21/187 |
| 2019/0109877 A1* | 4/2019 | Samuel | H04W 4/70 |
| 2019/0149460 A1* | 5/2019 | Andrews | H04L 67/55 |
| | | | 370/390 |
| 2019/0280955 A1 | 9/2019 | Gandhi et al. | |
| 2019/0319861 A1* | 10/2019 | Pan | H04L 41/5019 |
| 2020/0005308 A1* | 1/2020 | Snyder | G06Q 20/4016 |
| 2020/0019626 A1* | 1/2020 | Todd | H04L 9/3239 |
| 2020/0134620 A1 | 4/2020 | Aiello et al. | |
| 2020/0145816 A1* | 5/2020 | Morin | H04L 63/1433 |
| 2020/0151032 A1 | 5/2020 | Zhang et al. | |
| 2020/0220939 A1 | 7/2020 | Lawson et al. | |
| 2020/0244472 A1 | 7/2020 | Dinkelaker et al. | |
| 2021/0029216 A1* | 1/2021 | Stockert | G06F 16/2365 |

* cited by examiner

TOKENIZATION OF DISTRIBUTED COMPUTE RESOURCES

CROSS REFERENCES TO RELATED APPLICATIONS

This application is related to and claims priority from U.S. Provisional Patent Application 63/110,662, filed Nov. 6, 2020, which is incorporated herein by reference in its entirety.

BACKGROUND OF THE INVENTION

1. Field of the Invention

The present invention relates to tokenization of compute resources, and more specifically to automated tokenization of distributed compute resources in a multi-tenant hybrid fog computing cloud.

2. Description of the Prior Art

It is generally known in the prior art to provide a system for metering and billing users for compute resources in a cloud-based or edge-based system or fog-based system. Compute resources are consistently monitored and total usage can be calculated on demand via trigger functions such as the end of a billing or usage cycle. Compute ad billing transactions can be recorded on a distributed ledger and executed with a blockchain. The resources can be segmented into micro-service units.

Prior art patent documents include the following:

U.S. Patent Publication No. 2020/0220939 for System and method for providing a micro-services communication platform by inventors Lawson, et al., filed Mar. 18, 2020 and published Jul. 9, 2020, is directed to a multi-tenant media communication platform system and methods. The platform system includes media communication micro-services and micro-service configuration for a plurality of entities configured for use of the platform system. Enrolling an entity in the platform system includes setting entity configuration for use of the platform system by the entity. A micro-service request is processed according to the entity configuration. The micro-service request is a request for use of at least one micro-service of the platform system on behalf of the entity. Use of each micro-service is accounted for on behalf of the entity. Billing information for the entity is generated based on the accounting for the use of each micro-service on behalf of the entity. Entity configuration includes micro-service configuration, and micro-service configuration specifies at least one of: an endpoint mapping to at least one application logic URI, an event callback URI, and an event application logic URI.

U.S. Patent Publication No. 2020/0134620 for Carrier grade telecom blockchain by inventors Aiello, et al., filed Oct. 26, 2018 and published Apr. 30, 2020, is directed to an edge digital gate ("EDG") configured with entitlement services, universal identity repositories, and connection concentrator functions. The universal identity repositories each include a shared cache that together with other shared caches form a shared data environment ("SDE"). The SDE provides a distributed and shared cache used to chain together EDGs for operation as a blockchain network. The SDE may be check-pointed by stateless Virtual Network Functions ("VNFs") executing on the EDGs responsive to service demand and access, thus facilitating distributed consensus for validating each transaction. Through SDE the stateless VNFs disperse transaction-status based on a smart contract, which enforce transactions associated with blockchain-based digital services to which access is provided by the EDGs. The activity relating to the transactions may be recorded on a decentralized ledger of a blockchain network, generating an immutable record of activity of the entity and secure storage of service data.

U.S. Pat. No. 9,900,444 for System and method for online charging in a communication network by inventors Seetharaman, et al., filed Dec. 9, 2016 and issued Feb. 20, 2018, is directed to a system and method for online charging in a communication network. In one embodiment, a method is provided for online charging in a communication network. The method comprises monitoring at least one of a user characteristic, a session characteristic, an event characteristic, and a network condition during one or more ongoing communication sessions involving an online charging via one or more initial charging trigger functions, determining a need for selection of one or more new charging trigger functions based on at least one of the user characteristic, the session characteristic, the event characteristic, and the network condition, and dynamically selecting the one or more new charging trigger functions in response to the need so as to perform online charging for the one or more ongoing communication sessions based on substantially accurate determination of resource consumption in real-time.

U.S. Pat. No. 10,631,144 for Method and device for charging traffic data flow of user equipment by inventor Duan, filed Jul. 18, 2016 and issued Apr. 21, 2020, is directed to a charging method and device configured to realize charging for a local service without affecting an existing charging procedure when a service platform is deployed at a base station side. The charging method of the patent comprises: when a mobile edge computing gateway (MEC-GW) determines that a user equipment (UE) is to be charged for a local service, transmitting, to a mobile edge computing (MEC) server, a message requesting calculation of local service information associated with the UE; receiving, by the MEC-GW, local service calculation information associated with the UE transmitted by the MEC server, and generating, according to the local service calculation information associated with the UE, a charging data record for the local service associated with the UE; and transmitting, by the MEC-GW, the charging data record for the local service to a charging gate (CG).

U.S. Patent Publication No. 2020/0151032 for Event-driven serverless function orchestration by inventors Zhang, et al., filed Jan. 9, 2020 and published May 14, 2020, is directed to technology for coordinating execution of serverless functions. One or more events are received from one or more event sources. The one or more events are mapped to one or more event states of a function graph according to a mapping rule, the one or more event states including one or more actions, and the one or more actions which satisfied the mapping rule are executed. The received events are sent to a computer system to trigger the computer system initiating one or more computing resource groups for executing one or more serverless functions associated with the one or more actions. One or more responses are received from the serverless functions.

U.S. Patent Publication No. 2020/0244472 for Incremental billing with blockchains by inventors Dinkelaker, et al., filed Oct. 6, 2017 and published Jul. 30, 2020, is directed to a method for determining a resource use of resources provided by one or more devices in order to carry out a service, the method comprising at a miner: determining a latest block of a blockchain related to the service and a total resource information present in the latest block, wherein the total resource information represents the total amount of resources used by the one or more devices for providing the service since a defined starting point in time, determining that a new use case of resources of a first device of the one or more devices has occurred which is not reflected by the total resource information and determining a new amount of the resources used by the first device during the new use case, determining a new total resource information in which the total resource information is combined with the new amount of the resources and which reflects a complete use of the resources of the one or more devices from the defined starting point until determining the new total resource information, generating a new block of the blockchain, adding the new total resource information to the new block, and adding the new block to the blockchain.

U.S. Patent Publication No. 2019/0280955 for Methods, systems and devices for monitoring and managing network-connected device usage by inventors Gandhi, et al., filed May 30, 2019 and published Sep. 12, 2019 is directed to monitoring and managing usage of one or more network-connected devices over a network. The network-connected devices may include devices connected to the Internet of Things (IoT). Some aspects provide systems, methods and computing devices for: receiving usage and rate data associated with network-connected device(s); determining device expenditure data based on the usage and rate data; obtaining allocation information pertaining to a time period; updating information associated with one or more data files with the device expenditure data; comparing the updated information to the allocation information; and determining whether an allocation indicated by the allocation information for the time period is feasible.

U.S. Patent Publication No. 2019/0109877 for Secure application metering by inventors Samuel, et al., filed Feb. 23, 2018 and published Apr. 11, 2019, is directed to secure metering of modular applications and associated edge devices. In an example, a request to secure one or more modular applications associated with one or more edge device may be received. The edge device may be a device authorized to couple an IoT device to a cloud server. A modular application may be a discrete application performing device specific functions or a part of a distributed application, the part being hosted on the IoT device. Further, the request may include a security policy. One or more secure enclaves for executing the modular applications may be generated, based on the security policy. Further, resource utilization in the secure enclaves may be determined based on a predefined unit of consumption using a distributed ledger. Based on the resource utilization, a resource utilization receipt indicative of financial units corresponding to the resource utilization may be generated.

SUMMARY OF THE INVENTION

The present invention relates to tokenization of compute resources in a multi-tenant hybrid fog computing cloud.

It is an object of this invention to provide systems and methods for automated metering and tokenization of compute resources by a multi-tenant hybrid fog computing cloud in real time.

In one embodiment, the present invention includes a system for tokenization of distributed compute resources, including at least one edge computing platform in network communication with a plurality of server nodes, wherein the at least one edge computing platform includes at least one collector, at least one meter, and at least one analytics platform, wherein the at least one edge computing platform is operable to fetch data from at least one of the plurality of server nodes using a serverless function in response to a request, wherein the at least one edge computing platform is operable to monitor compute metrics, wherein the at least one collector is operable to determine consumption metrics for each of the plurality of server nodes based on the compute metrics, wherein the consumption metrics include capacity data, wherein the at least one collector is operable to transmit the consumption metrics to the at least one meter, wherein the at least one meter is operable to generate metering data based on the consumption metrics, wherein the at least one analytics platform is operable to aggregate the consumption metrics and the metering data from the plurality of server nodes to generate analytics data for at least one user account, wherein the at least one edge computing platform is operable to develop a billing scheme for usage of the distributed compute resources using the consumption metrics, the metering data, and/or the analytics data, wherein the at least one edge computing platform is operable to compensate each of the plurality of server nodes for usage of the distributed compute resources, and wherein the at least one edge computing platform is operable to store the consumption metrics, the metering data, and/or the analytics data on a distributed ledger.

In an alternative embodiment, the present invention includes a system for tokenization of distributed compute resources including at least one edge computing platform in network communication with a plurality of server nodes, wherein the at least one edge computing platform includes at least one collector, at least one meter, and at least one analytics platform, wherein the at least one edge computing platform is operable to fetch data from at least one of the plurality of server nodes using a serverless function in response to a request, wherein the at least one edge computing platform is operable to monitor compute metrics, wherein the at least one collector is operable to determine consumption metrics for each of the plurality of server nodes based on the compute metrics, wherein the consumption metrics include capacity data, wherein the at least one collector is operable to transmit the consumption metrics to the at least one meter, wherein the at least one meter is operable to generate metering data based on the consumption metrics, wherein the at least one analytics platform is operable to aggregate the consumption metrics and the metering data from the plurality of server nodes to generate analytics data for a plurality of user accounts, wherein the at least one edge computing platform is operable to develop a billing scheme for usage of the distributed compute resources using the consumption metrics, the metering data, and/or the analytics data, wherein the at least one edge computing platform is operable for multi-party settlement between the plurality of user accounts using the billing scheme, wherein the at least one edge computing platform is operable to compensate each of the plurality of server nodes for usage of the distributed compute resources, and wherein the at least one edge computing platform is operable to store the consumption metrics, the metering data, and/or the analytics data on a distributed ledger.

In yet another embodiment, the present invention includes a method for tokenization of distributed compute resources including at least one edge computing platform in network communication with a plurality of server nodes, the at least one edge computing platform fetching data from at least one of the plurality of server nodes using a serverless function in response to a request, the at least one edge computing platform monitoring compute metrics, at least one collector determining consumption metrics for each of the plurality of server nodes, wherein the consumption metrics include capacity data, the at least one collector transmitting the consumption metrics to at least one meter, the at least one meter generating metering data based on the consumption metrics, at least one analytics platform aggregating the consumption metrics and the metering data from the plurality of server nodes and generating analytics data, the at least one edge computing platform developing a billing scheme for usage of the distributed compute resources based on the consumption metrics, the metering data, and the analytics data, and the at least one edge computing platform compensating each of the plurality of server nodes for usage of the distributed compute resources.

These and other aspects of the present invention will become apparent to those skilled in the art after a reading of the following description of the preferred embodiment when considered with the drawings, as they support the claimed invention.

DETAILED DESCRIPTION

Figure 1:
FIG. 1 illustrates an example of a multi-tenant hybrid fog computing cloud.

The present invention is generally directed to systems and methods for tokenization of distributed compute resources.

In one embodiment, the present invention includes a system for tokenization of distributed compute resources, including at least one edge computing platform in network communication with a plurality of server nodes, wherein the at least one edge computing platform includes at least one collector, at least one meter, and at least one analytics platform, wherein the at least one edge computing platform is operable to fetch data from at least one of the plurality of server nodes using a serverless function in response to a request, wherein the at least one edge computing platform is operable to monitor compute metrics, wherein the at least one collector is operable to determine consumption metrics for each of the plurality of server nodes based on the compute metrics, wherein the consumption metrics include capacity data, wherein the at least one collector is operable to transmit the consumption metrics to the at least one meter, wherein the at least one meter is operable to generate metering data based on the consumption metrics, wherein the at least one analytics platform is operable to aggregate the consumption metrics and the metering data from the plurality of server nodes to generate analytics data for at least one user account, wherein the at least one edge computing platform is operable to develop a billing scheme for usage of the distributed compute resources using the consumption metrics, the metering data, and/or the analytics data, wherein the at least one edge computing platform is operable to compensate each of the plurality of server nodes for usage of the distributed compute resources, and wherein the at least one edge computing platform is operable to store the consumption metrics, the metering data, and/or the analytics data on a distributed ledger.

In an alternative embodiment, the present invention includes a system for tokenization of distributed compute resources including at least one edge computing platform in network communication with a plurality of server nodes, wherein the at least one edge computing platform includes at least one collector, at least one meter, and at least one analytics platform, wherein the at least one edge computing platform is operable to fetch data from at least one of the plurality of server nodes using a serverless function in response to a request, wherein the at least one edge computing platform is operable to monitor compute metrics, wherein the at least one collector is operable to determine consumption metrics for each of the plurality of server nodes based on the compute metrics, wherein the consumption metrics include capacity data, wherein the at least one collector is operable to transmit the consumption metrics to the at least one meter, wherein the at least one meter is operable to generate metering data based on the consumption metrics, wherein the at least one analytics platform is operable to aggregate the consumption metrics and the metering data from the plurality of server nodes to generate analytics data for a plurality of user accounts, wherein the at least one edge computing platform is operable to develop a billing scheme for usage of the distributed compute resources using the consumption metrics, the metering data, and/or the analytics data, wherein the at least one edge computing platform is operable for multi-party settlement between the plurality of user accounts using the billing scheme, wherein the at least one edge computing platform is operable to compensate each of the plurality of server nodes for usage of the distributed compute resources, and wherein the at least one edge computing platform is operable to store the consumption metrics, the metering data, and/or the analytics data on a distributed ledger.

In yet another embodiment, the present invention includes a method for tokenization of distributed compute resources including at least one edge computing platform in network communication with a plurality of server nodes, the at least one edge computing platform fetching data from at least one of the plurality of server nodes using a serverless function in response to a request, the at least one edge computing platform monitoring compute metrics, at least one collector determining consumption metrics for each of the plurality of server nodes, wherein the consumption metrics include capacity data, the at least one collector transmitting the consumption metrics to at least one meter, the at least one meter generating metering data based on the consumption metrics, at least one analytics platform aggregating the consumption metrics and the metering data from the plurality of server nodes and generating analytics data, the at least one edge computing platform developing a billing scheme for usage of the distributed compute resources based on the consumption metrics, the metering data, and the analytics data, and the at least one edge computing platform compensating each of the plurality of server nodes for usage of the distributed compute resources.

None of the prior art discloses a platform that manages a multi-tenant hybrid fog computing cloud and a tokenization system for distributed compute resources wherein the metering and tokenization of distributed compute resources is executed automatically and in real time at the node of a distributed peer-to-peer edge network. Though the prior art may disclose automated billing systems for resource use, there is currently no system that integrates tokenization and multi-tenant hybrid fog computing cloud systems in one platform with automated execution.

Referring now to the drawings in general, the illustrations are for the purpose of describing one or more preferred embodiments of the invention and are not intended to limit the invention thereto.

In a serverless environment, it is necessary to meter usage of distributed compute resources in order to properly bill users for usage. The present invention provides a platform that integrates distributed edge computing infrastructure with automated tokenization and billing for distributed compute resources. In a preferred embodiment, the present invention includes a content delivery network (CDN) and serverless framework that advantageously provides low latency and increased data integrity. The present invention provides systems and methods for automated metering, tokenization, and billing for distributed compute resources in a content delivery network. Advantageously, the present invention measures and meters usage of distributed compute resources at a granular level. A content delivery network is a network of proxy servers and data centers geographically distributed over an area. CDNs increase availability and performance by locating services closer to end users. CDNs provide Internet content including, but not limited to, web objects (e.g., text, images, scripts), downloadable objects (e.g., media files, software, documents), applications, streaming media (e.g., live, on demand), and social media sites.

In one embodiment of the present invention, tokenization of distributed compute resources refers to a granular analysis of usage of the distributed compute resources in order to develop a billing scheme for compensation of the usage. In typical content delivery networks, edge devices compensate their usage of compute resources using a flat rate and/or an itemized payment scheme. These systems do not capture the true usage of compute resources and often result in inaccurate measurement of usage and/or overcharging. The present invention is operable to measure and analyze usage of distributed compute resources on a node-by-node basis to determine how much computational power an edge device uses. The platform of the present invention is operable to determine if an edge device uses compute resources from a plurality of nodes and how much each edge device uses from each node. Advantageously, the present invention is operable to determine usage in real time or near real time using at least one collector, at least one meter, and at least one analytics platform.

In one embodiment, tokenization includes determining a unit of usage. For example, the unit is time-dependent, e.g., an amount used in a set amount of time. Alternatively, the unit is task-dependent, e.g., an amount used to fulfill a single request, an amount used to fulfill a group of requests. In yet another embodiment, the unit is a resource metric. In one embodiment, tokenization further includes attaching a token to the unit wherein the token is a data element that does not include sensitive data. Examples of sensitive data include, but are not limited to, device identifiers, location data, request types, request content, and/or details about request fulfillment. Using the token to represent the unit enables the platform to share usage data and/or execute transactions related to usage without exposing the sensitive data. Alternatively, the platform does not attach a token to the unit and does not record and/or transmit sensitive data. Determining the unit of usage enables more accurate metering. In one embodiment, metering refers to determining compensation for usage of compute resources. In one embodiment, metering includes developing a dynamic billing scheme.

FIG. 1 is an example of a global content delivery network (CDN). A plurality of end users access content via a plurality of CDN proxy servers connected to an origin server.

Modern CDNs operate with tens to hundreds of points of presence (POPs) in major metropolitan areas. These POPs are generally co-located in carrier-neutral data centers. The CDNs provide value by caching content in these POPs and servicing users in the general vicinity through local last-mile networks.

The CDN of the present invention extends even further from these POPs to get closer to end users and devices than previously possible. The POPs of the present invention not only include carrier-neutral data centers, but office buildings, residential buildings, industrial sites, 5G microcells and femtocells, WI-FI access points, etc. The CDN of the present invention forms a "far edge" at the extreme border of the network (e.g., on the same local area network (LAN) or 5G cell as a user or smart device).

A key weakness of modern CDNs is that POPs are essentially islands of infrastructure. There is no intelligent network between nodes in a CDN-POP. Therefore, cache misses to a POP always result in origin fetches, even if another nearby CDN-POP already has a cached copy of the data.

The CDN of the present invention is formed of not only data center POPs, but tiny points of presence deployed across an area (e.g., city). Nodes in the present invention cooperate intelligently as a network to overcome the limitations of modern CDNs and clouds. The nodes form a decentralized cache, eliminating origin prefetches when nearby nodes have copies of the data or fragments of the data.

Another problem in modern CDNs is the origin fetch itself. The further the origin server is from the CDN proxy, the higher the latency, and the longer it takes to establish a connection and retrieve data for a user. Advantageously, the nodes of the present invention are operable to cooperate to maintain a pool of persistent connections to as many other proxy nodes as reasonable, which are then operable to be used for proxy requests.

In one embodiment, the nodes of the CDN of the present invention are operable to communicate and cooperate as a network to fulfill cache requests rather than relying on a centralized origin. This network structure means that usage of compute resources is distributed, as a request from one edge device to a first node could result in expenditure of compute resources by at least one additional node to help fulfill the request. In non-distributed content delivery networks, a request to a first node would only result in the first node using compute resources to fulfill the request using either data cached on the first node or data fetched from an origin. In the present invention, properly measuring consumption associated with each node and/or each edge device utilizing the network requires a platform that is operable to measure and meter usage of resources at a high level of detail. In a preferred embodiment, the platform is operable to determine usage in real time or near real time. Additionally, smart contracts enable automated calculation of usage and subsequent metering and tokenization.

The present invention utilizes a distributed edge computing platform (sometimes referred to as "EDJX") to reduce latency and increase network throughput to Hypertext Transfer Protocol (HTTP) clients (edge devices) by locating server nodes in close proximity to edge devices. The edge platform of the present invention is operable to write, test, and deploy low-latency edge applications. The edge platform is further operable to execute serverless functions or otherwise retrieve data from the platform compute nodes located in close proximity to the client. The edge platform is Application Programming Interface (API) compatible with cloud infrastructures including, but not limited to, GOOGLE CLOUD PLATFORM, AMAZON WEB SERVICES (AWS), and MICROSOFT AZURE.

An edge device is any device which provides an entry point into enterprise or service provider core networks. Examples include, but are not limited to, routers, routing switches, integrated access devices (IADs), multiplexers, metropolitan area network (MAN) access devices, wide area network (WAN) access devices, IoT devices, sensors, industrial machines, personal computing devices, laptop computing devices, tablet computing devices, mobile computing devices, cameras, and any other device that produces and/or collects data.

In a preferred embodiment the edge platform of the present invention overcomes current issues in the prior art, including latency and bandwidth limitations at the edge, by deploying serverless functions in close proximity to edge devices. The edge platform further enables edge devices to securely access and record data at the edge using Distributed Ledger Technologies, including, but not limited to, blockchain.

Advantageously, the present invention overcomes the operational deployment limitations of prior art edge clouds by incorporating the following: (1) serverless computing, (2) Distributed Ledger Technology, including, but not limited to, blockchain, (3) content addressing, and (4) conflict-free replicated data types.

Serverless computing, also known as functions-as-a-service (FaaS), is a cloud computing execution model which dynamically manages the allocation of resources on-demand according to events. Serverless functions are instantiated just-in-time to respond to events within an environment (e.g., network requests) or the arrival or modification of data, and typically run to completion and then terminate, returning resources to the system. In a serverless computing environment, functions are developed and executed without respect to infrastructure, software libraries, or other dependencies.

Distributed Ledger Technologies (DLT) refers generally to a family of technologies that includes blockchain used to create and manage distributed data structures wherein a growing list of records, called blocks, are linked cryptographically. In a preferred embodiment of the present invention, each serverless request is validated by and recorded to a Distributed Ledger Technology to create an immutable record of execution.

In one embodiment of content-addressed systems, a cryptographic checksum of the data is used as the address for the data, creating a self-validating scheme that assures data integrity. Rather than connecting to a location to request the data, content-addressed networks route the data to the location of the requestor, offloading protocol overhead to ad-hoc infrastructure.

In distributed computing, a conflict-free replicate data type (CRDT) is a data structure that can be replicated across multiple computers, where the replicas can be updated independently and concurrently without coordination between peers.

The platform of the present invention provides a content-addressed data network (sometimes referred to as "EdjNet"), which enables the transparent, opportunistic, and secure dissemination of data between nodes in a peer-to-peer network. The platform includes a peer-to-peer protocol that uses cryptographic identities, delegation of trust, and endto-end encryption, to create a global namespace for self-validating data that runs transparently over IPv4 and/or IPv6 networks. In a preferred embodiment, the system encrypts data including, but not limited to, network traffic, stored data, and logs.

A node is a single unit of hardware with a defined minimal central processing unit (CPU), random access memory (RAM), disk storage, and network bandwidth configured to (i) support execution of functions, (ii) store content delivery network (CDN) content, and (iii) store information related to groups & policies for making authorization decisions. Fog computing refers to an architecture wherein resources and services of computing, storage, control, and networking are pushed to nodes in a peer-to-peer distributed edge computing platform.

The nodes in the peer-to-peer distributed edge computing platform (sometimes referred to as "EDJX nodes") are zero-configuration nodes, meaning the nodes are operable to acquire any configuration dynamically and on-the-fly from the ad-hoc environment. Consequently, all nodes are identical from a software stack and configuration point of view, removing the need for orchestration and configuration management.

In a preferred embodiment, every node in the distributed edge computing platform is designed for zero-configuration and all nodes are essentially identical. In one embodiment, the distributed edge computing platform dynamically allocates and schedules resources based on individual node capabilities without operator intervention.

In one embodiment, the system includes a plurality of node types including, but not limited to, a greedy node, a non-greedy node, a bootstrap node, and/or a super node. A greedy node is a node which is operable to store a large percentage or all of the content propagated on the peer-to-peer network. A greedy node is typically a large node with significant storage capacity. A non-greedy node is a node that does not store all of the content propagated on the peer-to-peer network. In one embodiment, a non-greedy node is only interested in storing content for which the non-greedy node receives frequent requests. In one embodiment, a non-greedy node has a more limited storage capacity than a greedy node. A bootstrap node is a special node to which all other nodes on the peer-to-peer network connect to and register with when added to the peer-to-peer network. In one embodiment, the bootstrap node shares with each node its list of peers based on the node's registered geolocation. A super node is a node that is a greedy node and provides additional capabilities of a bootstrap node.

Each node preferably has a unique global identifier. In a preferred embodiment, each node maintains a registry of all nodes in the form of data blocks, a registry of data blocks the node possesses or has learned from other nodes, and a number of data blocks which are persisted to the node. Nodes discover one another using a variety of methods, including, but not limited to, multicast Domain Name Server (DNS) and by establishing adjacency with predefined "super nodes". Communication between nodes is preferably encrypted using public key cryptography. One example of public key cryptography is S/Kademlia, which is detailed in I. Baumgart and S. Mies, "S/Kademlia: A practicable approach towards secure key-based routing," 2007 International Conference on Parallel and Distributed Systems, Hsinchu, 2007, pp. 1-8, doi: 10.1109/IC-PADS.2007.4447808, which is hereby incorporated herein by reference in its entirety. Alternatively, communication between nodes is via encrypted transmission including, but not limited to, secure socket layers (SSL) and/or secure hypertext transfer protocol (HTTPS).

Figure 2:
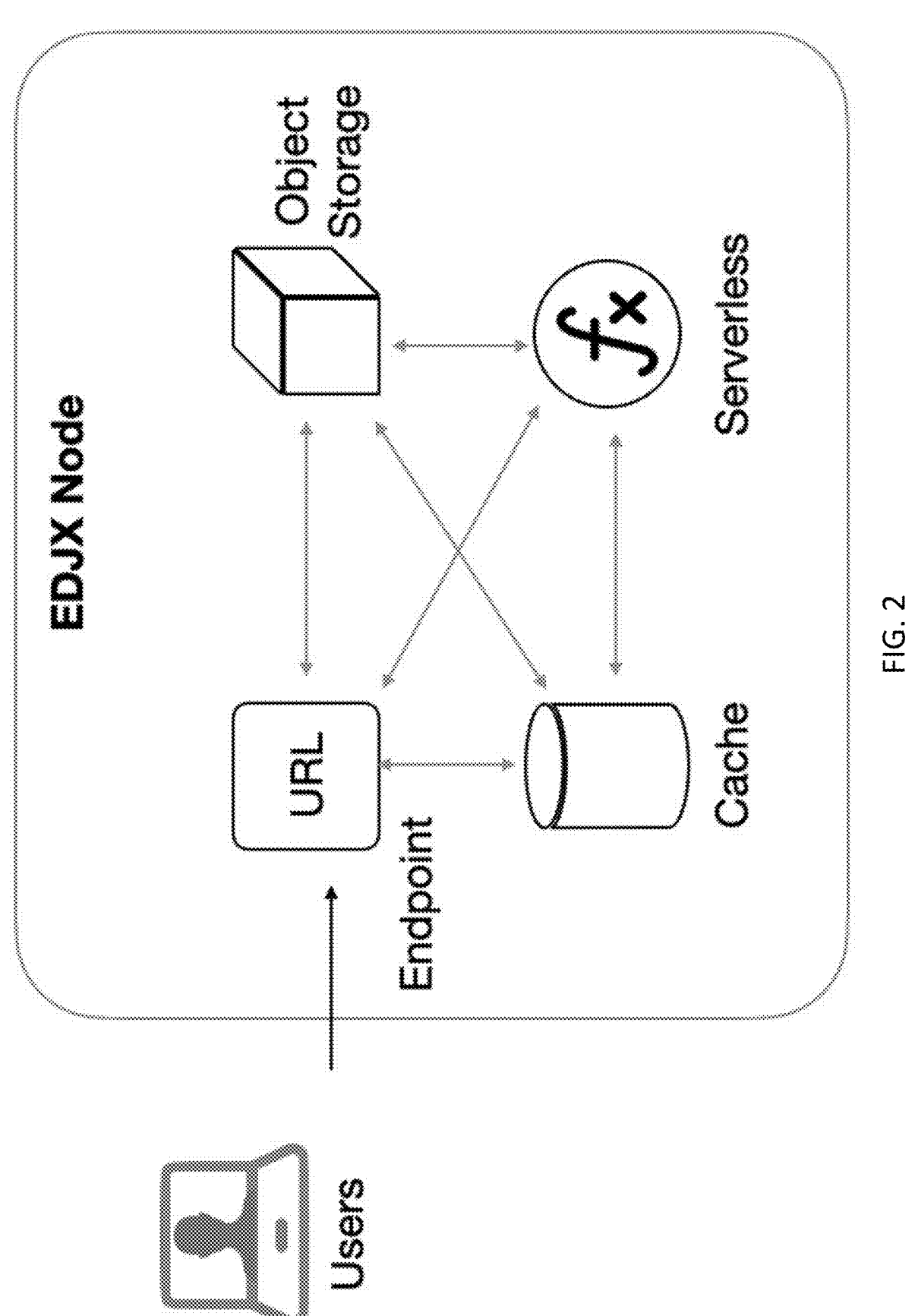
FIG. 2 illustrates an example of a node.

The nodes connect to each other and transfer objects called data blocks, which represent files and other data structures. When a node has established connections with a number of peers above a configurable threshold, it is eligible to generate new data blocks and disseminate the new data blocks through the network. Each node is preferably operable to create, store, and/or retrieve a plurality of blocks at the same time. Alternatively, each node is operable to create, store, and/or retrieve a plurality of blocks sequentially. FIG. 2 illustrates an example of a node with object storage and serverless computing.

The distributed edge computing platform of the present invention integrates infrastructure for metering and tokenization of distributed compute resources with the content delivery network. In a preferred embodiment of the present invention, measuring and metering of resource usage is performed at the nodes of the content delivery network. In one embodiment, the metering platform includes at least one collector, at least one meter, and at least one analytics platform as described in U.S. Pat. No. 10,303,576, which is incorporated herein by reference in its entirety. The at least one collector is in network communication with the at least one meter and the at least one analytics platform. The at least one collector includes a collector API and a local database. The at least one meter includes a meter API, and the at least one analytics platform includes an analytics API. The at least one collector is operable to measure consumption metrics and send the consumption metrics to the at least one meter. Consumption metrics include but are not limited to consumption data, capacity data, and cost data. In one embodiment, capacity data includes surplus capacity data. In one embodiment, the surplus capacity data is dynamic and is determined in real time or near real time. In one embodiment, the present invention includes a plurality of collectors for each of the at least one meter. In one embodiment, the at least one meter includes a cost calculator, a capacity calculator, a correction calculator, and a data retention manager. In one embodiment, the at least one meter aggregates and stores data received from the at least one collector. The at least one meter calculates consumption of distributed compute resources based on the consumption metrics received from the at least one collector, thereby creating metering data. In one embodiment, the at least one meter is operable to correct for usage of distributed compute resources that has already been accounted for when creating the metering data. Usage of distributed compute resources is verified through a consensus in one embodiment. Actors of the system include but are not limited to users and providers. Each actor of the system has a unique identifier (ID). In one embodiment, the unique ID is cryptographic. In one embodiment, the consumption metrics and the metering data are shared at a macro level across a network with a plurality of nodes across the network. For example, aggregate consumption metrics and metering data are shared with the plurality of nodes across the network. The aggregate consumption metrics and metering data include but are not limited to total consumption metrics and metering data over a period of time, a rate of consumption, capacity data, trends in consumption metrics and metering data, a number of requests, a rate of requests, and/or a number of actors accessing the node. The names of each actor of the system are obscured for privacy purposes. Visibility to metering data is only on a single node that an actor is connected to. In another embodiment, visibility to metering data is on a plurality of nodes on the same network. Each node in the content delivery network writes metering data to a distributed object storage platform. Advantageously, the distributed object storage platform negates the need for a centralized database to store metering data from each node.

In one embodiment, the at least one analytics platform is operable to store data from the at least one collector and the at least one meter. The at least one analytics platform is operable to create and deliver consumption reports for each actor of the system according to their unique ID. In one embodiment, the at least one analytics platform is operable to aggregate consumption and metering data from a plurality of nodes in order to determine usage of distributed compute resources. In one embodiment, the at least one analytics platform uses machine learning. The at least one analytics platform is operable to deliver advanced industry and market analytics data. The advanced industry and market analytics data include but are not limited to usage patterns, predictive information, trends in usage of distributed compute resources, trends in compensation, recommendations for future usage of distributed compute resources, recommendations for cost savings, optimization data, analytics data on the actors of the system, return on investment (ROI) data, estimated growth cycles, and/or data on market conditions. In one embodiment, the at least one analytics platform provides a planning tool for operators to adjust usage of distributed compute resources. In another embodiment, the at least one analytics platform provides a calculator for the users to maximize savings and/or ROI. In one embodiment, the at least one analytics platform includes a graphical user interface (GUI). In one embodiment, the at least one analytics platform is a third-party analytics platform.

In a preferred embodiment of the present invention, the operations of the at least one collector, the at least one meter, and the at least one analytics platform are automated. In one embodiment, the distributed edge computing platform implements at least one smart contract to automate the metering and tokenization of distributed compute resources. The metering and tokenization of distributed compute resources is initiated when one or more conditions of the at least one smart contract are met. In a preferred embodiment, the at least one smart contract is deployed on a Distributed Ledger Technology such as blockchain and the transactions of the at least one smart contract are recorded on a Distributed Ledger Technology such as blockchain. In one embodiment, the metering and tokenization of distributed compute resources occurs at a constant frequency as determined by the at least one smart contract. In another embodiment, the metering and tokenization of distributed compute resources occurs at random intervals as determined by the at least one smart contract. In other alternatives, the metering and tokenization of distributed compute resources is initiated by an expiration of a time period or an occurrence of an event, such as a billing cycle ending or other event-based or time-based triggers. The event-based or time-based triggers include but are not limited to a fulfillment of market conditions, a time of day, a demand for distributed compute resources, a supply of distributed compute resources, market forecasts, a predicted change in demand for distributed compute resources, a predicted change in supply of distributed compute resources, and/or historical data regarding distributed compute resources. In one embodiment, the metering and tokenization of distributed compute resources is initiated by an HTTP request. Alternatively, the metering and tokenization of distributed compute resources is initiated when the total distributed compute resource usage meets a threshold. In another embodiment, the metering and tokenization of distributed compute resources is initiated when a user stops accessing the CDN. In yet another embodiment, the metering and tokenization of distributed compute resources is initiated by an operator, by a user, or by an edge device. In one embodiment, the at least one smart contract is initiated by the creation of at least one function by another function. Alternatively, the at least one smart contract is initiated by at least one request for at least one function by another function.

The platform of the present invention includes at least one smart contract API. In one embodiment, the at least one smart contract is triggered by the at least one smart contract API. The terms of the smart contract are operable to be set and adjusted via the at least one smart contract API. The at least one smart contract API is operable to be accessed by an edge node, and is also operable to be accessed by the distributed edge computing platform. The at least one smart contract API is operable to be implemented by third-party networks. The third-party networks include but are not limited to public networks, private networks, and/or block-chain-based networks.

In a preferred embodiment of the present invention, the metering and tokenization of distribute compute resources occurs in real time or in near real time. In one embodiment, the metering and tokenization of distributed compute resources occurs as the CDN is delivering content to the user. The metering and tokenization of distributed compute resources include the monitoring of a plurality of metrics. The plurality of metrics include but are not limited to a number of each request type, a number of requests handled by each service, a request rate, a number of requests over a given time period, a request error rate, a DNS request rate, a time taken for requests, a request fulfillment percentage, a response time latency per node, memory usage, central processing unit (CPU) usage, disk usage, storage usage, disk input/output (I/O), network I/O, a number of cache hits, and a number of cache misses.

The present invention provides a system for billing users for usage of distributed compute resources. In one embodiment, the present invention bills users on a micropayment scale for usage of distributed compute resources. In one embodiment, the billing scheme for the usage of distributed compute resources is dependent on the advanced industry and market analytics data provided by the at least one analytics platform. Alternatively, the billing scheme for the usage of distributed compute resources is dependent on the plurality of metrics monitored during the metering and tokenization of distributed compute resources. In one embodiment, the billing scheme for usage of distributed compute resources is dependent on the traffic of the CDN at the time of usage. In one embodiment, the platform compensates with cryptocurrency (sometimes referred to as "EdjCoin") for usage of distributed compute resources. In another embodiment, the user pays in cash. Alternatively, the user pays in credit.

In one embodiment, the present invention provides systems and methods for multi-party settlement according to metered usage of distributed compute resources. The platform is operable to monitor and meter usage of distributed compute resources across all nodes of the content-addressed data network. The platform is then operable to compensate each node for usage as determined by the automated metering and tokenization of distributed compute resources. For example, a user allocates $100 to the platform of the present invention for usage of distributed compute resources. Node A executes 40% of the user's code, while the remaining 60% of the user's code is executed by Node B. The platform meters the usage across Node A and Node B that corresponds to the user and facilitates compensation of Node A for $40 and compensation of Node B for $60. In a preferred embodiment, multi-party settlement according to metered usage of distributed compute resources is conducted using a native cryptocurrency such as EdjCoin. Alternatively, multi-party settlement according to metered usage of distributed compute resources is paid conducted using a third party cryptocurrency such as BITCOIN, ETHEREUM, or RIPPLE.

The billing and compensation for usage of distributed compute resources are also automated by the at least one smart contract according to one embodiment of the present invention. The at least one analytics platform delivers consumption reports for billing. The smart contract is operable to charge user accounts for the usage provided in the consumption reports and transfer compensation for usage of distributed compute resources from the user accounts to provider accounts. In one embodiment, the user accounts include digital wallet accounts. The user digital wallet accounts are loaded with funds to pay for the usage of distributed compute resources. The platform transfers the cryptocurrency from the user digital wallet accounts to the provider digital wallet accounts according to the consumption reports. In another embodiment, the user and/or provider digital wallet accounts are linked to standard banking payment accounts where cryptocurrencies are exchanged for fiat currency. The platform transfers the funds from the user payment accounts to the provider payment accounts according to the consumption reports.

Figure 3:
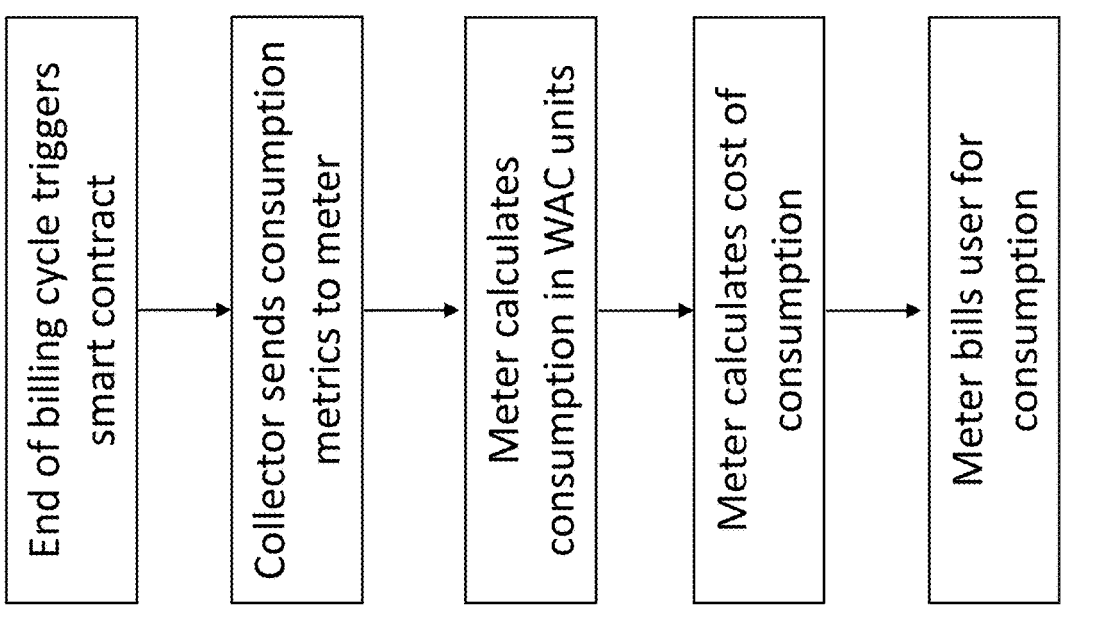
FIG. 3 illustrates an example of an automated metering and billing process.

In a preferred embodiment, the present invention meters users for distributed compute resources at a high granularity. In one embodiment, the usage of distributed compute resources is measured by a number of requests per second. In one embodiment, the at least one collector determines and measures usage of distributed compute resources using a Workload Allocation Cube (WAC) unit as described in U.S. Pat. No. 8,756,302, which is incorporated herein by reference in its entirety. In one embodiment, the WAC unit includes but is not limited to measurements of MHz for CPU or processor usage, Mbytes for memory usage, Kbytes/sec for input/output (I/O), Kbytes/sec for Local Area Network (LAN) usage, Kbits/sec for Wide Area Network (WAN) usage, and Gbytes for storage usage. The WAC unit includes weighting and conversion factors. In one embodiment, the weighting and conversion factors are dynamic. In one embodiment, the WAC unit includes factors that account for environmental variables and infrastructure, e.g. real estate cost, tax jurisdiction, and electrical power. Activity of the CDN is measured in the same unit as the usage of distributed compute resources. In one embodiment, the meter API of the present invention includes a WAC calculator container. The meter API is operable to calculate WAC units from data received from the at least one collector. Advantageously, the WAC unit encompasses the true resource usage for a plurality of computing resource types and does not include excessive and/or irrelevant resource usage. In one embodiment, the WAC unit is an average of the individual measurements that make up the WAC unit. In one embodiment, the metering is based on an average of WAC units. FIG. 3 illustrates one embodiment of the present invention wherein the process of metering and billing for consumption of distributed compute resources is automated by a smart contract. In another embodiment, the at least one smart contract receives data from the at least one meter. The at least one smart contract is operable to calculate consumption in WAC units and the cost of consumption.

Figure 4:
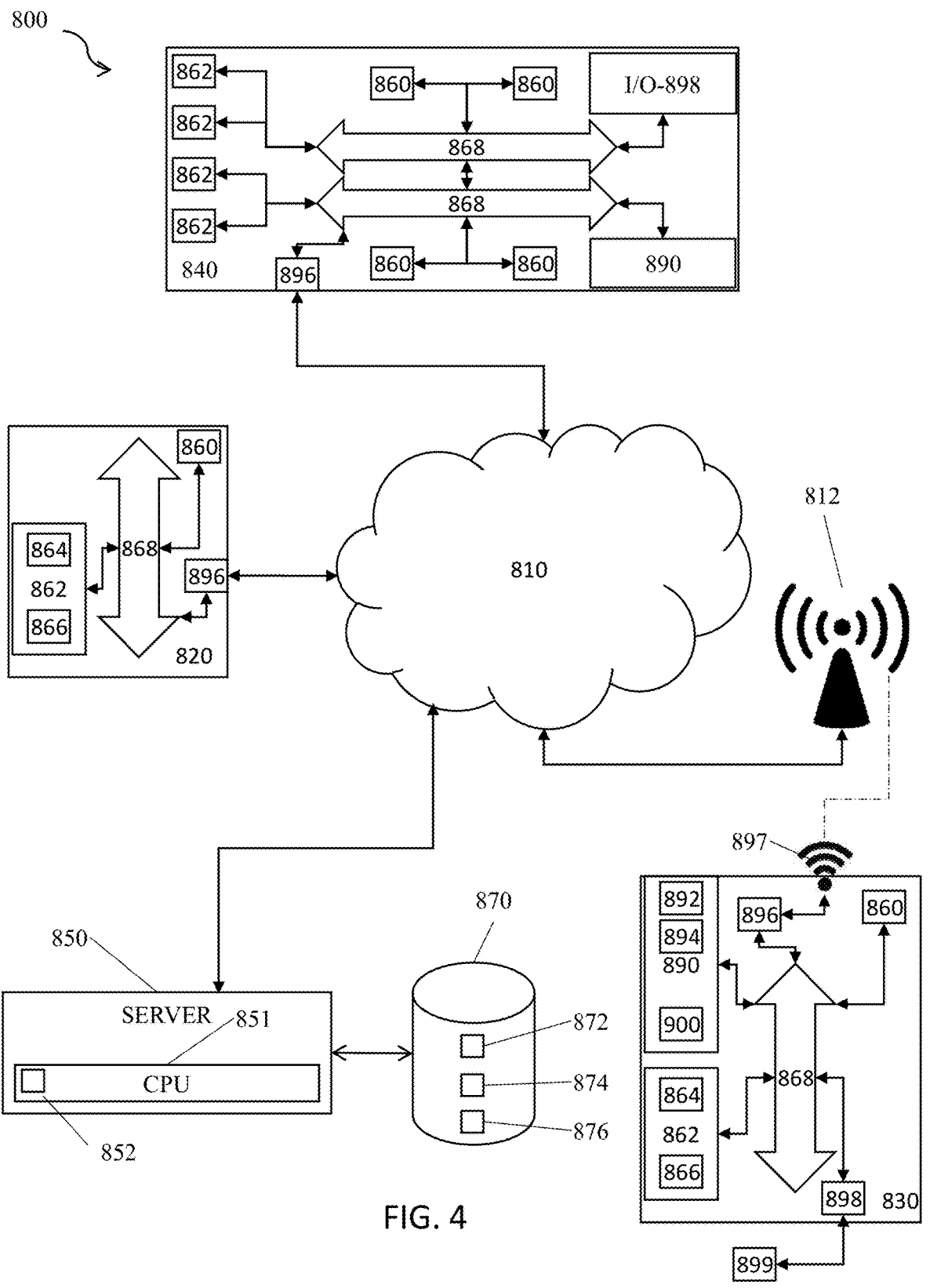
FIG. 4 is a schematic diagram of the system of the present invention.

FIG. 4 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 4, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 4, is operable to include other components that are not explicitly shown in FIG. 4, or is operable to utilize an architecture completely different than that shown in FIG. 4. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system, comprising:
   at least one edge computing platform and a plurality of server nodes;
   wherein the at least one edge computing platform is in network communication with the plurality of server nodes;
   wherein the at least one edge computing platform does not record and/or transmit sensitive data;

wherein each server node of the plurality of server nodes is comprised of at least a processor and a memory;
   wherein each server node of the plurality of server nodes is a zero-configuration node;
   wherein each server node of the plurality of server nodes is operable to cooperate to maintain a pool of persistent connections to other server nodes;
   wherein the at least one edge computing platform includes at least one collector, at least one meter, and at least one analytics platform;
   wherein the at least one edge computing platform is operable to fetch data from at least one of the plurality of server nodes using a serverless function in response to a request;
   wherein the at least one collector is operable to transmit consumption metrics to the at least one meter;
   wherein the consumption metrics include dynamic surplus capacity data for each of the plurality of server nodes, and wherein the consumption metrics are based on compute metrics associated with the at least one edge computing platform;
   wherein the at least one meter is operable to generate metering data based on the consumption metrics when one or more conditions of at least one smart contract are met;
   wherein the at least one smart contract is triggered by at least one smart contract application programming interface (API) operable to be accessed by the at least one edge computing platform;
   wherein the at least one analytics platform is operable to generate analytics data for at least one user account;
   wherein the analytics data includes a combination of the consumption metrics and the metering data from the plurality of server nodes;
   wherein the at least one edge computing platform is associated with a billing scheme for usage of distributed compute resources;
   wherein the billing scheme uses the at least one smart contract, the consumption metrics, the metering data, and the analytics data;
   wherein the billing scheme is dependent on advanced industry and market data provided by the at least one analytics platform;
   wherein the at least one edge computing platform is operable to transmit payment to each of the plurality of server nodes for usage of the distributed compute resources using the billing scheme; and
   wherein the at least one edge computing platform is operable to store the consumption metrics, the metering data, and the analytics data on a distributed ledger.

2. The system of claim 1, wherein the request is a Hypertext Transfer Protocol (HTTP) request.

3. The system of claim 1, wherein the data fetched from the at least one of the plurality of server nodes is content-addressed.

4. The system of claim 1, wherein each of the plurality of server nodes is operable to persist the data to the plurality of server nodes via the pool of persistent connections.

5. The system of claim 1, wherein the compute metrics include a number of requests, a number of request types, a request rate, a request error rate, a domain name service (DNS) request rate, a request fulfillment time, a request fulfillment percentage, a latency time, memory usage, central processing unit (CPU) usage, disk usage, storage usage, disk input/output (I/O), network I/O, a number of cache hits, and/or a number of cache misses.

6. The system of claim 1, wherein the at least one collector includes a collector database.

7. The system of claim 1, wherein the consumption metrics include consumption data and/or cost data for the distributed compute resources.

8. The system of claim 1, wherein the at least one meter includes a cost calculator, a capacity calculator, a correction calculator, and/or a data retention manager.

9. The system of claim 1, wherein the metering data includes a rate of consumption, the dynamic surplus capacity data, at least one trend in consumption metrics, at least one trend in the metering data, a number of requests, and/or a rate of requests.

10. The system of claim 1, wherein the consumption metrics and the metering data are shared with the plurality of server nodes.

11. The system of claim 1, wherein the at least one analytics platform is operable to use machine learning to generate the analytics data.

12. The system of claim 1, wherein the analytics data includes a usage pattern, predictive data, at least one trend in usage of the distributed compute resources, at least one trend in compensation, a recommendation, optimization data, return on investment (ROI) data, user account data, an estimated growth cycle, and/or the market data.

13. The system of claim 1, wherein the at least one collector, the at least one meter, and/or the at least one analytics platform are controlled by the at least one smart contract.

14. A system, comprising:

at least one edge computing platform and a plurality of server nodes;

wherein the at least one edge computing platform is in network communication with the plurality of server nodes;

wherein the at least one edge computing platform does not record and/or transmit sensitive data;

wherein each server node of the plurality of server nodes is comprised of at least a processor and a memory;

wherein each server node of the plurality of server nodes is a zero-configuration node;

wherein each server node of the plurality of server nodes is operable to cooperate to maintain a pool of persistent connections to other server nodes;

wherein the at least one edge computing platform includes at least one collector, at least one meter, and at least one analytics platform;

wherein the at least one edge computing platform is operable to fetch data from at least one of the plurality of server nodes using a serverless function in response to a request;

wherein the at least one collector is operable to transmit consumption metrics to the at least one meter;

wherein the consumption metrics include dynamic surplus capacity data for each of the plurality of server nodes, and wherein the consumption metrics are based on compute metrics associated with the at least one edge computing platform;

wherein the at least one meter is operable to generate metering data based on the consumption metrics when one or more conditions of at least one smart contract are met;

wherein the at least one smart contract is triggered by at least one smart contract application programming interface (API) operable to be accessed by the at least one edge computing platform;

wherein the at least one analytics platform is operable to to generate analytics data for a plurality of user accounts;

wherein the analytics data includes a combination of the consumption metrics and the metering data from the plurality of server nodes;

wherein the at least one edge computing platform is associated with a billing scheme for usage of distributed compute resources;

wherein the billing scheme uses the at least one smart contract, the consumption metrics, the metering data, and the analytics data;

wherein the billing scheme is dependent on advanced industry and market data provided by the at least one analytics platform;

wherein the at least one edge computing platform is operable to transmit payment between the plurality of user accounts using the billing scheme;

wherein the at least one edge computing platform is operable to transmit payment to each of the plurality of server nodes for usage of the distributed compute resources using the billing scheme; and wherein the at least one edge computing platform is operable to store the consumption metrics, the metering data, and the analytics data on a distributed ledger.

15. The system of claim 14, wherein the consumption metrics include consumption data and/or cost data for the distributed compute resources.

16. The system of claim 14, wherein the metering data includes a rate of consumption, the dynamic surplus capacity data, at least one trend in consumption metrics, at least one trend in the metering data, a number of requests, a rate of requests, and/or a number of user accounts accessing at least one of the plurality of server nodes.

17. The system of claim 14, wherein the analytics data includes a usage pattern, predictive data, at least one trend in usage of the distributed compute resources, at least one trend in compensation, a recommendation, optimization data, return on investment (ROI) data, user account data, an estimated growth cycle, and/or the market data.

18. The system of claim 14, wherein the billing scheme is further based on traffic across the plurality of server nodes.

19. A method comprising:

providing at least one edge computing platform in network communication with a plurality of server nodes each comprising at least a processor and a memory, wherein each server node of the plurality of server nodes is a zero-configuration node, wherein the at least one edge computing platform includes at least one collector, at least one meter, and at least one analytics platform, wherein the at least one edge computing platform does not record and/or transmit sensitive data, and wherein each server node of the plurality of server nodes is operable to cooperate to maintain a pool of persistent connections to other server nodes;

the at least one edge computing platform fetching data from at least one of the plurality of server nodes using a serverless function in response to a request;

the at least one collector transmitting consumption metrics to the at least one meter, wherein the consumption metrics include dynamic surplus capacity data for each of the plurality of server nodes, and wherein the consumption metrics are based on compute metrics associated with the at least one edge computing platform;

the at least one meter generating metering data based on the consumption metrics when one or more conditions of at least one smart contract are met, wherein the at least one smart contract is triggered by at least one smart contract application programming interface (API) operable to be accessed by the at least one edge computing platform;

the at least one analytics platform generating analytics data, wherein the analytics data includes a combination of the consumption metrics and the metering data from the plurality of server nodes;

the at least one edge computing platform is associated with a billing scheme for usage of distributed compute resources, wherein the billing scheme is based on the at least one smart contract, the consumption metrics, the metering data, and the analytics data, and wherein the billing scheme is dependent on advanced industry and market data provided by the at least one analytics platform; and the at least one edge computing platform transmitting payment to each of the plurality of server nodes for usage of the distributed compute resources using the billing scheme.

20. The method of claim 19, further comprising the at least one edge computing platform storing the consumption metrics, the metering data, and the analytics data on a distributed ledger.

\* \* \* \* \*